US007931101B2

(12) United States Patent
Pham et al.

(10) Patent No.: US 7,931,101 B2
(45) Date of Patent: Apr. 26, 2011

(54) PROPORTIONAL JOYSTICK WITH INTEGRAL SWITCH

(75) Inventors: Toan D. Pham, Cedar Park, TX (US); Rucker Ashmore, Horseshoe Bay, TX (US); Lisa Rotelli, Lakeway, TX (US)

(73) Assignee: Invacare Corporation, Elyria, OH (US)

(*) Notice: Subject to any disclaimer, the term of this patent is extended or adjusted under 35 U.S.C. 154(b) by 1098 days.

(21) Appl. No.: 11/581,197

(22) Filed: Oct. 13, 2006

(65) Prior Publication Data

US 2008/0088110 A1 Apr. 17, 2008

(51) Int. Cl.
*B60W 10/00* (2006.01)
*G06F 3/033* (2006.01)

(52) U.S. Cl. ....................................... 180/65.1; 345/161

(58) Field of Classification Search ................. 180/65.1, 180/315, 333

See application file for complete search history.

(56) References Cited

U.S. PATENT DOCUMENTS

| | | | | |
|---|---|---|---|---|
| 3,814,199 | A * | 6/1974 | Jones | 180/6.5 |
| 4,511,825 | A * | 4/1985 | Klimo | 318/67 |
| 4,533,827 | A * | 8/1985 | Fincher | 250/214 PR |
| 5,033,000 | A * | 7/1991 | Littlejohn et al. | 701/36 |
| 5,555,949 | A * | 9/1996 | Stallard et al. | 180/6.5 |
| RE35,707 | E * | 12/1997 | Takamiya et al. | 600/16 |
| 6,222,282 | B1 * | 4/2001 | Rossi et al. | 307/9.1 |
| 6,484,829 | B1 * | 11/2002 | Cox | 180/8.1 |
| 6,615,937 | B2 * | 9/2003 | Richey et al. | 180/6.5 |
| 7,113,854 | B2 * | 9/2006 | Mansell et al. | 701/36 |
| 2005/0195166 | A1 * | 9/2005 | Cooper et al. | 345/161 |
| 2007/0035516 | A1 * | 2/2007 | Voto et al. | 345/161 |
| 2007/0055424 | A1 * | 3/2007 | Peters et al. | 701/36 |
| 2007/0056780 | A1 * | 3/2007 | Jaenke et al. | 180/65.1 |
| 2007/0056781 | A1 * | 3/2007 | Mattes et al. | 180/65.1 |
| 2007/0056782 | A1 * | 3/2007 | Chopcinski et al. | 180/65.1 |
| 2007/0080003 | A1 * | 4/2007 | Koerlin et al. | 180/65.1 |
| 2008/0088110 | A1 * | 4/2008 | Pham et al. | 280/250.1 |
| 2009/0153370 | A1 * | 6/2009 | Cooper et al. | 341/21 |

OTHER PUBLICATIONS

User Manual for "Point-It Mini Joystick", Jan. 2005 by Unique Perspectives.
Spectronics on-line product catalog pages for Unique Perspectives, Ltd. "Point-It Mini Joystick", Sep. 2006.
Spectronics on-line product catalog pages for "TASH Mini-Joystick with Push Switch", Oct. 2006.

* cited by examiner

*Primary Examiner* — Jeffrey J Restifo
(74) *Attorney, Agent, or Firm* — Calfee, Halter & Griswold LLP

(57) ABSTRACT

An input device, such as a joystick, provides proportional input signals related to a position of an actuating member along an actuation surface and also includes a switch that provides an additional signal when the actuating member is moved in a direction perpendicular to the actuation surface.

23 Claims, 3 Drawing Sheets

PROPORTIONAL JOYSTICK WITH INTEGRAL SWITCH

BACKGROUND

FIG. 1 illustrates a wheelchair input device 10 that includes a proportional joystick 12 and a signal converter 22. The joystick 12 includes a housing 15 in which a gimbal 14 is movably mounted. Due to the internal configuration of the joystick, the gimbal is free to move within the housing along a hemispheric surface, such that each position of the gimbal corresponds to a unique two dimensional position. The two dimensional position coordinates for the gimbal are communicated by two potentiometers as will be described in more detail below. In addition to moving along the hemispheric surface, the gimbal can also be moved in a direction perpendicular to the hemispheric surface as indicated by the phantom lines in FIG. 1. This perpendicular actuation closes a switch located in the bottom of the housing. The switch provides a binary output for wheelchair control. Outputs 16 of the joystick's potentiometers and the switch are connected to the signal converter 20 that converts the signals into wheelchair control signals that can be received by a wheelchair controller and used to set various wheelchair operating parameters. A connector 22 plugs into a standard port of the wheelchair controller. While a hemispheric joystick actuation surface is described herein, other surfaces such as a plane or other appropriate surface may be employed to implement the input device.

SUMMARY

An input device, such as a joystick, provides proportional input signals for a wheelchair controller related to a position of an actuating member along an actuation surface and also includes a switch that provides an additional signal when the actuating member is moved in a direction perpendicular to the actuation surface.

DESCRIPTION

Figure 1:
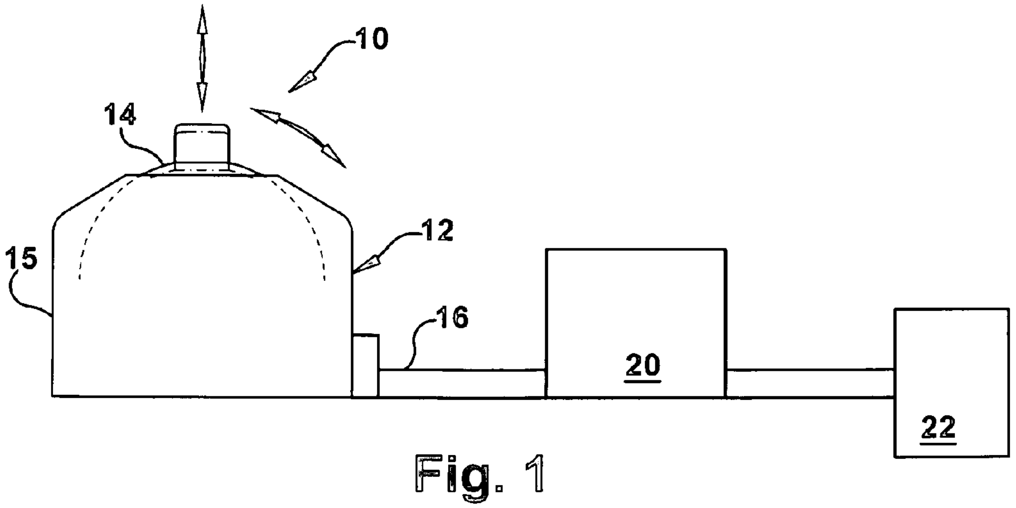
FIG. 1 is a perspective view of a proportional joystick constructed in accordance with the present invention.

FIG. 1 illustrates a wheelchair input device 10 that includes a proportional joystick 12 and a signal converter 22. The joystick 12 includes a housing 15 in which a gimbal 14 is movably mounted. Due to the internal configuration of the joystick, the gimbal is free to move within the housing along a hemispheric surface, such that each position of the gimbal corresponds to a unique two dimensional position. The two dimensional position coordinates for the gimbal are communicated by two potentiometers as will be described in more detail below. In addition to moving along the hemispheric surface, the gimbal can also be moved in a direction perpendicular to the hemispheric surface as indicated by the phantom lines in FIG. 1. This perpendicular actuation closes a switch located in the bottom of the housing. The switch provides a binary output for wheelchair control. Outputs of the joystick's potentiometers and the switch are connected to the signal converter 22 that converts the signals into wheelchair control signals that can be received by a wheelchair controller and used to set various wheelchair operating parameters. A connector 22 plugs into a standard port of the wheelchair controller. While a hemispheric joystick actuation surface is described herein, other surfaces such as a plane or other appropriate surface may be employed to implement the input device.

Figure 2:
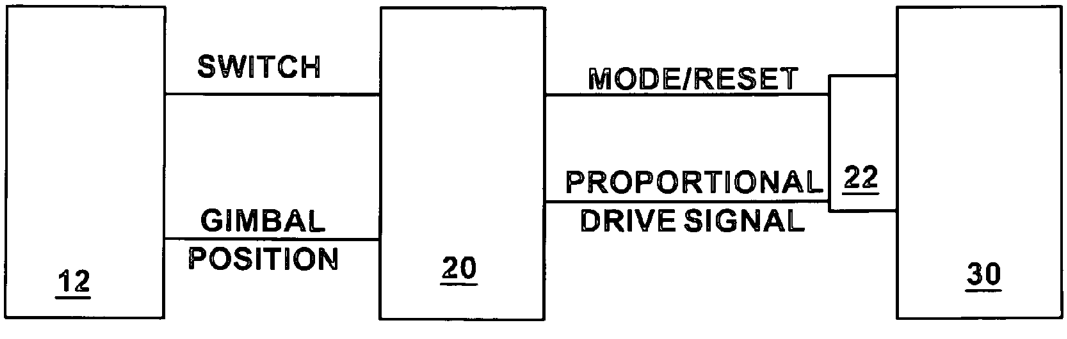
FIG. 2 is functional block diagram of a wheelchair control system that includes the proportional joystick of FIG. 1.

FIG. 2 is a functional block diagram of a wheelchair control system. The joystick 12 provides a proportional signal corresponding to the position of the gimbal to the signal converter 20. The signal converter 20 converts the proportional signal into a signal to be received by a wheelchair controller 30. For example the proportional signal can be a speed for each of the drive wheels that would cause the wheelchair to be moved in the direction the gimbal is pointing and at the relative speed indicated by the gimbal position. For example, taking the top center of the gimbal's hemispheric surface as the starting point, each ray that starts at this center defines a direction of travel and the farther the gimbal is away from the center along the ray, the faster the wheelchair would move in that direction. The proportional signal provides the x,y coordinates of the gimbal's position and the converter 20 maps those coordinates to the appropriate controller input signal to cause the controller to move the wheelchair accordingly.

The switch signal is also input to the converter 20, which routes it to the wheelchair controller as a binary input. The controller translates the occurrence of a switch actuation as a mode select or reset input, depending on the controller's current mode and the position of the gimbal when the switch is actuated. For example, if the wheelchair is in drive mode, actuation of the switch may cause the controller to place the wheelchair in a mode in which seating actuators may be controlled by moving the joystick. In this case, the controller then translates the subsequent proportional signals to control the actuators, rather than the drive wheels of the wheelchair.

Figure 3:
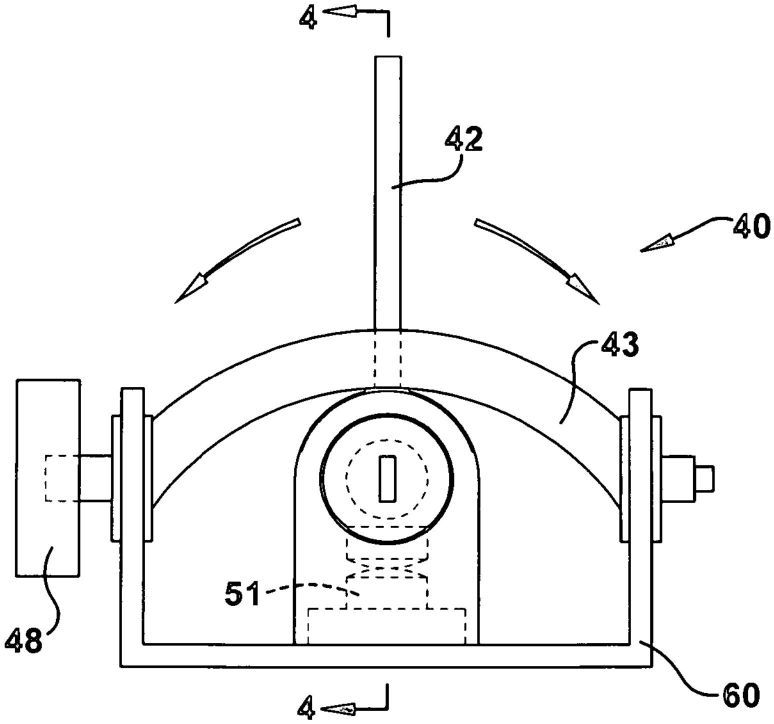
FIGS. 3 and 4 are fragmentary cross section views of the proportional joystick of FIG. 1.
Figure 4:
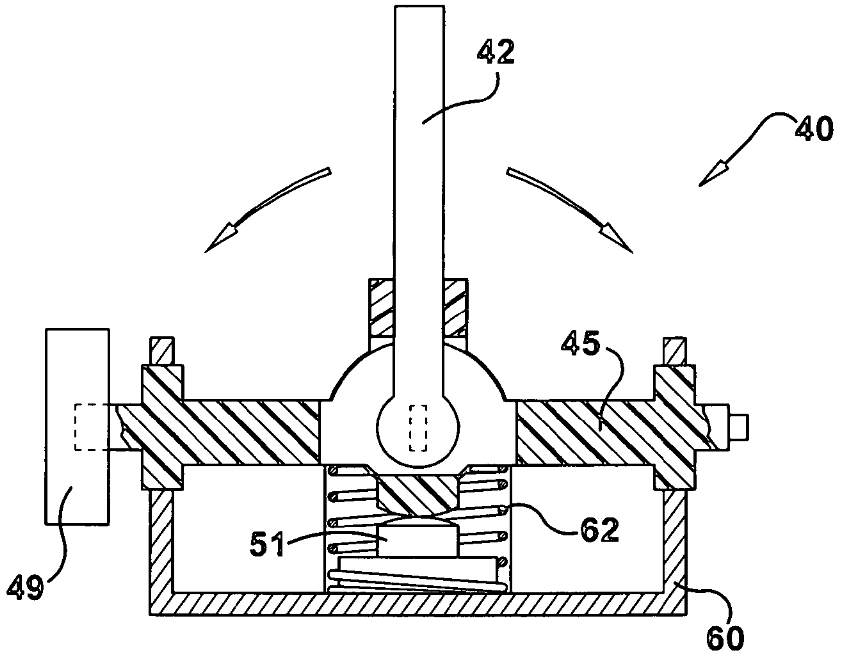

FIGS. 3 and 4 illustrate a dual action input device 40 that underlies the gimbal. In FIG. 4 an actuating shaft 42 is shown that is connected to the gimbal so that movement of the gimbal is translated into movement of the shaft. The shaft 42 is pivotally connected to a first cross member 45. The cross member 45 is able to pivot within a switch support structure 60 in a direction into and out of the drawing sheet. One end of the cross member 45 is pressed into a rotatable disc 49. The disc is part of a potentiometer that outputs a voltage that is proportional to the degree of rotation of the first cross member. The shaft 42 protrudes through a second cross member 43 (FIG. 3) that is an arced, slotted, guide. Like the first cross member, the second cross member is pressed into a rotatable disc 48 that is part of a potentiometer that outputs a voltage that is proportional to the degree of rotation of the second cross member. Movement of the shaft perpendicular to the second cross member causes the second cross member and the disc to rotate and change the signal being output by the potentiometer. By pivoting within the first cross member as guided by the slot in the pivoting arced second cross member, the gimbal can be guided to all positions within the hemisphere of actuation.

A micro switch 51 is mounted within the base of the joystick on the support structure 60. The micro switch, which is normally open, can be closed by movement of the gimbal in a direction perpendicular to the hemispheric surface until the shaft contacts the switch and closes it. A biasing spring 62 is placed between the shaft 42 and the micro switch to urge the shaft out of engagement with the switch. The characteristics of the spring can be varied to provide a very light actuation force, which can be helpful to users with limited strength or control. In fact, a light action spring can make it possible for a user to actuate the switch using a single finger or a lip. Users with this type of limited mobility often could not actuate a separate reset button.

Figure 5:
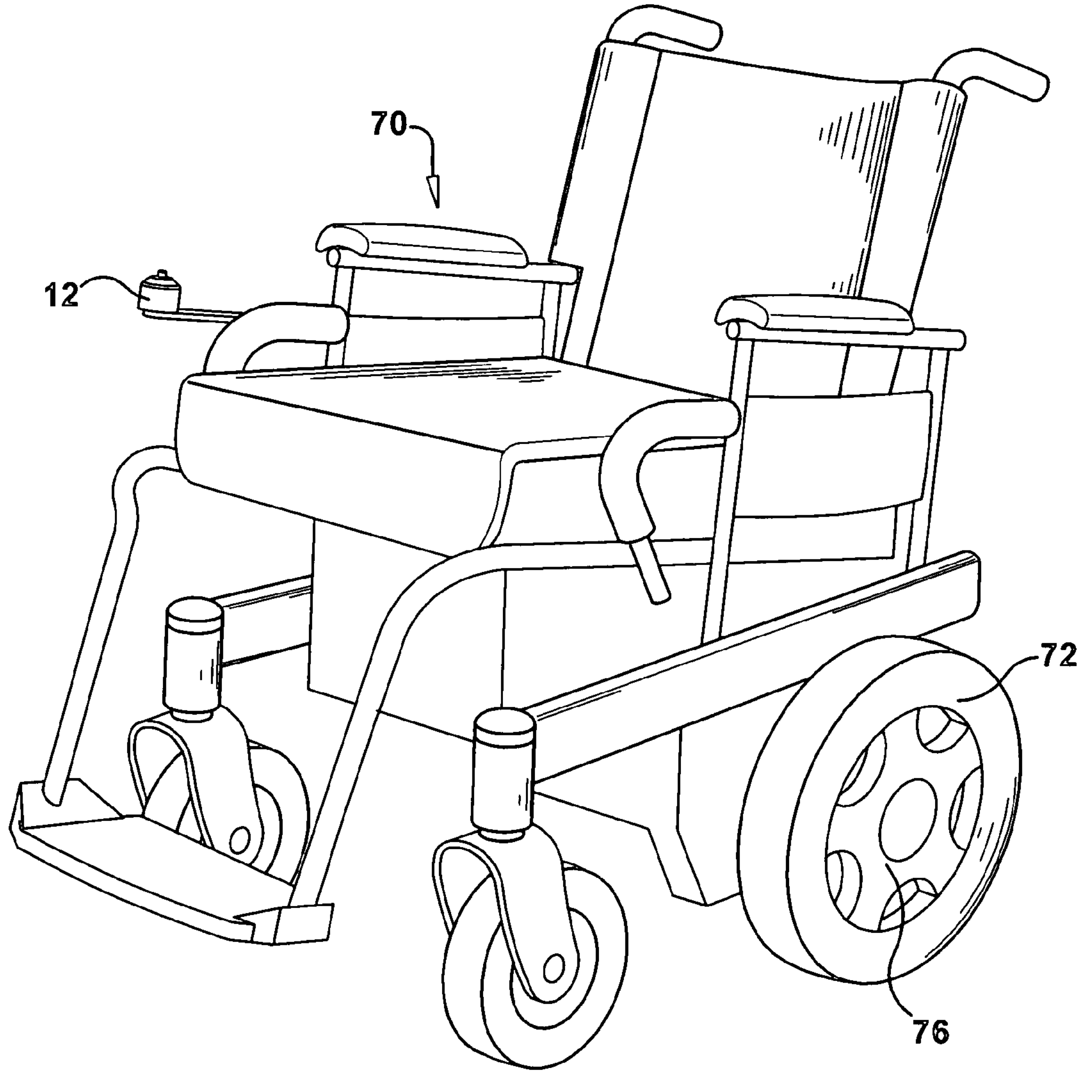
FIG. 5 is an example of a power driven wheelchair having the proportional joystick of FIG. 1.

FIG. 5 illustrates a power driven wheelchair 70 that includes drive wheels 72 that are driven within hub motors 76. The proportional joystick 12 is used to control the wheelchair. Modifications can be made to the wheelchair to place the joystick within reach of the user's finger or lip. Signals from the joystick are used to provide drive signals to the hub motors and other actuators and components on the wheelchair.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. An input control device for use with a power-driven wheelchair comprising:

a housing configured for connection to a power driven wheelchair controller;

an actuating member mounted within the housing, wherein the actuating member is movable within the housing along an actuating surface;

at least one potentiometer coupled to the actuating member that outputs signals indicative of a position of the actuating member on the actuating surface;

a switch in proximity to the actuating member, wherein the switch comprises multiple switch states during use of the actuating member by movement of the actuating member in a direction substantially perpendicular to the actuating surface and wherein actuation of the switch produces a switch actuation signal; and a signal converter in electrical communication with the potentiometer and the switch wherein the signal converter converts the position signal from the potentiometer to a proportional input control signal for a wheelchair controller and the switch actuation signal into a binary input control signal for the wheelchair controller.

2. The input control device of claim 1 wherein the actuation surface is approximately hemispheric and wherein the actuating member is a semi-spherical gimbal that includes a protruding nub.

3. The input control device of claim 1 wherein the actuating member is a shaft.

4. The input control device of claim 1 including two potentiometers that output signals corresponding to two dimensional coordinates along the actuation surface that indicate the position of the gimbal.

5. The input control device of claim 1 including a biasing member mechanically coupled to the actuating member that urges the actuating member to a home position in which the switch is open.

6. The input control device of claim 5 wherein the biasing member is a light action spring.

7. The input control device of claim 5 wherein the switch is mounted underneath the actuating member, and wherein movement of the actuating member in the direction substantially perpendicular to the actuating surface actuates the switch by closing the switch.

8. The input control device of claim 1 wherein the controller is capable of being placed in one of a plurality of controller modes according to which a given proportional input control signal is converted to one of several wheelchair control signals.

9. The input control device of claim 8 wherein the controller transitions between controller modes in response to the switch actuation signal.

10. The input control device of claim 1 wherein at least one switch state is associated with a user selection.

11. The input control device of claim 10 wherein the user selection is at least one of a mode select and reset input.

12. A wheelchair comprising:

a main body;

a seat supported by the main body;

first and second drive wheels with first and second hub motors coupled to the main body; and a controller that provides control signals to the first and second hub motors, wherein the controller includes an input device that includes:

a housing;

an actuating member mounted within the housing, wherein the actuating member is movable within the housing along an actuation surface;

at least one potentiometer coupled to the actuating member that outputs signals indicative of a position of the actuating member on the actuation surface;

a switch coupled to the actuating member, wherein the switch comprises multiple switch states during use of the actuating member by movement of the actuating member in a direction substantially perpendicular to the actuation surface and wherein actuation of the switch produces a switch actuation signal; and a signal converter in electrical communication with the potentiometer and the switch wherein the signal converter converts the position signal from the potentiometer to a proportional input control signal for a wheelchair controller and the switch actuation signal into a binary input control signal for the wheelchair controller.

13. The wheelchair of claim 12 wherein the actuation surface is approximately hemispheric and the actuating member is a semi-spherical gimbal that includes a protruding nub.

14. The wheelchair of claim 12 wherein the actuating member is a shaft.

15. The wheelchair of claim 12 wherein the input device includes two potentiometers that output signals corresponding to two dimensional coordinates along the actuation surface that indicate the position of the gimbal.

16. The wheelchair of claim 12 wherein the input device includes a biasing member mechanically coupled to the actuating member that urges the actuating member to a home position in which the switch is open.

17. The wheelchair of claim 16 wherein the biasing member is a light action spring.

18. The wheelchair of claim 12 wherein the controller is capable of being placed in one of a plurality of controller modes according to which a given input signal is converted to one of several control signals.

19. The wheelchair of claim 18 wherein the controller transitions between controller modes in response to the actuation signal.

20. The wheelchair of claim 12 wherein the proportional control signal is a speed control signal for each of the hub motors.

21. An input control device for use with a power-driven wheelchair comprising:

a housing configured for connection to a power driven wheelchair controller;

an actuating member mounted within the housing, wherein the actuating member is movable within the housing along a hemispheric surface;

at least one potentiometer coupled to the actuating member that outputs signals indicative of a position of the actuating member on the hemispheric surface;

a switch in proximity to the actuating member, wherein the switch comprises multiple switch states during use of the actuating member by movement of the actuating member in a direction substantially perpendicular to the hemispheric surface and wherein actuation of the switch produces a switch actuation signal; and a signal converter in electrical communication with the potentiometer and the switch wherein the signal converter converts the position signal from the potentiometer to a proportional input control signal for a wheelchair controller and the switch actuation signal into a binary input control signal for the wheelchair controller.

22. The input control device of claim 21 wherein the actuating member is a semi-spherical gimbal that includes a protruding nub.

23. The input control device of claim 21 including two potentiometers that output signals corresponding to two dimensional coordinates along the hemispheric surface that indicate the position of the gimbal.

* * * * *